Figure 1:
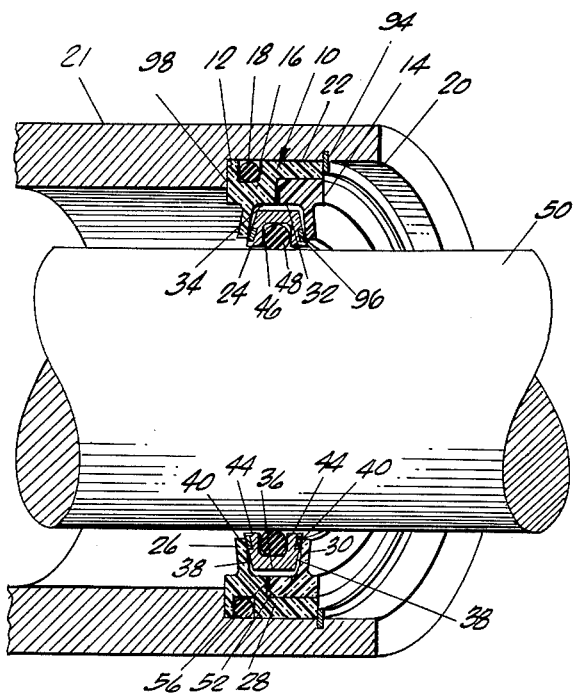

Aug. 7, 1962   L. A. WOOD   3,048,413
ROTATING SHAFT SEAL
Filed Oct. 15, 1959

INVENTOR.
LORIN A. WOOD
BY
Edwin Coates
ATTORNEY

United States Patent Office 3,048,413
Patented Aug. 7, 1962

1

3,048,413
ROTATING SHAFT SEAL
Lorin A. Wood, Los Angeles, Calif., assignor to Douglas
Aircraft Company, Inc., Santa Monica, Calif.
Filed Oct. 15, 1959, Ser. No. 846,707
8 Claims. (Cl. 277—95)

This invention relates to pressure seals and more particularly to rotatable shaft seals used on control system operating shafts which pass through bulkheads from pressurized to non-pressurized areas.

This invention contemplates a generally new rotatable shaft sealing unit which is unitized to provide a readily installable seal that has greatly improved sealing characteristics. This seal reduces the required shaft finish and tolerance, and also reduces the force due to friction developed between the seal and the shaft.

Rotatable shaft seals are generally known in the art. However, most of the prior art seals are too complex in their design to provide utility for commercial use. They are generally large in size, and difficult to install, requiring installation in one direction only, and because of their complexity, necessitate a higher degree of maintenance. The principle of operation of most of these seals is to bring into contact, normal to the axis of rotation of the shaft, two highly finished surfaces. Said surfaces are held in contact by a mechanical or resilient spring means, and therefore are dependent upon the continuous, unchangeable operation of the spring means to provide the desired seal. Inherent in the physical properties of most spring means is the change in the spring constant produced by a change in temperature. Thus, a change in temperature of the environment surrounding the spring means will result in an undesired change in the sealing force. This has been found undesirable where the seal is used on equipment subject to great variations in temperature and pressure. Such a condition is encountered in some portion of an airplane during its normal flight. A further disadvantage, inherent in some prior art rotatable shaft seals, is the necessity of having a specifically designed highly finished shaft to cooperate with the seal to produce the desired operation. Further, most of the prior art seals have a large friction force developed by the seal. This provides little problem when the shaft is turned by a relatively large prime mover, but this type of seal has little utility where the torque imparted to the shaft is relatively small, such as the torque developed by a control system shaft for aircraft controls. Further it has been found desirable to reduce the friction developed by a shaft seal, where the shaft motion is controlled by a human. In aviation, this is referred to as pilot feel. In certain control operations, it is imperative that the pilot physically feel through his control means the magnitude of motion of a control surface. Thus, the reduction of all extraneous force on the shaft connecting the control means and control surface is imperative.

To obviate these difficulties the following described rotating shaft seal provides a seal around a shaft which is relatively unaffected by temperature change and one that does not need a specifically configured highly finished shaft to function properly. In the seal of this invention, the sealing elements are not held in contact primarily by a spring means. A shaft of standard tolerance and cross section will provide the desired result.

In this invention the seal between the shaft and the housing is not made by a stationary seal mounted within the housing bearing against the shaft as it rotates as is the convention, but by the stationary part of a unitary seal mounted in the shaft housing and bearing against a rotatable part of the sealing unit that has been sealed to the shaft. This has raised the point of rotating seal from the shaft surface to within the sealing unit itself. By shifting the point of rotating seal, the tolerance and finish required on the shaft are greatly reduced, since the shaft need only be statically sealed to the rotatable part of the sealing unit.

It has been found that if two theoretically perfectly smooth surfaces are brought into contact, a perfect seal between the surfaces will result. However, because of the impossibility of producing perfectly smooth surfaces, a distortion in the surfaces breaks down the seal. Therefore, to reduce the chance of distortion, this invention utilizes a thin line of contact rather than a large area of contact. As a result of the employment of the line of contact, a reduced force due to friction of the seal also results.

In its presently preferred embodiment the invention consists of a non-rotatable member comprising a plurality of matable annular rings. A ring seal is recessed into the outer surface of one of the annular rings and makes a sealing contact with a counterbore in the shaft housing. Each annular ring has an inwardly extending flexible lip. The lips are so displaced in substantially parallel relationship to each other as to define a channel. This enables the lips to receive and make sealing contact with an annular rotatable member. Said rotatable member has a ring seal recessed into its radially inner surface so that the rotatable member makes a sealing contact with the rotating shaft and will rotate with it.

Figure 2:
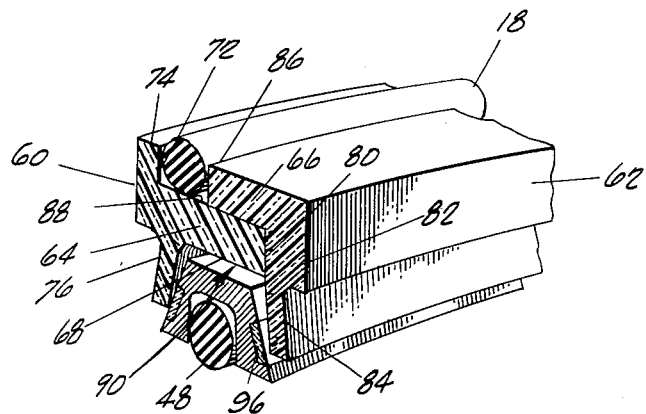

Other advantages of the invention will hereinafter become more fully apparent from the following description of the annexed drawing, which illustrates a preferred embodiment, and wherein:

FIG. 1 is a fragmentary perspective view of a section of the presently preferred embodiment of this invention, showing the seal in a standard installation; and FIG. 2 is a fragmentary perspective view of a section of a modification of the preferred embodiment of this invention.

Referring now to FIG. 1, the preferred embodiment of the rotatable shaft seal of the invention includes a stationary, non-rotatable member 10. Said member comprises a pair of annular, matable resilient rings 12, 14. The first, larger annular ring 12 has a modified rectangular transverse cross section. Said ring 12 has a peripheral annular groove 16 formed in a first surface 22. As seen in transverse cross section, the groove 16 has a depth sufficient to enable it to receive and secure an annular sealing ring 18. Said sealing ring 18 has a diameter slightly larger than the depth of the groove 16. This permits the sealing ring 18 to make sealing contact with the adjacent counterbore 20 of the shaft housing 21.

Extending radially inward from a second surface 24 oppositely disposed from said first surface 22 is a flexible lip 26. A substantial portion of said second surface 24 has been removed by a notch or counterbore 28. Said notch has sufficient depth and length to receive and secure the second smaller matable annular ring 14. Said ring 14 also has a flexible lip 30 extending radially inward from its inner surfaces 32. When said matable rings are placed in a mating position, to be described in more detail later, said flexible lips 26, 30 project inwardly from said stationary member to define a channel 34 with a depth sufficient to receive and seal with a rotatable member 36.

The annular surfaces 38 of said rotatable member 36 adjacent to the lips are inclined with respect to said lips. This inclination provides an increasing force of thin line contact between the inclined surfaces 38 and the lip inside corners 40 as the rotatable member 36 is inserted into said channel 34. The force produced by the insertion of the rotatable member causes the lips 26, 30 to be deflected outwardly from their normal vertical position. However, this deflection is opposed by the resilient property of the material composing said lips. The resilient force of the lips pushing back against the horizontal component of the physical force inserting the rotatable member 36 into the channel 34 produces a good sealing contact between the stationary member 10 and the rotatable member 36.

In the presently preferred embodiment of the seal said lip inside corners 40 are sharp rather than blunt. This provides a relatively small circular line of sealing contact between the stationary member 10 and the rotatable member 36. If the small line of contact were broadened out with a blunt corner instead of relatively sharp corner it would produce, instead of the line of contact, an area of contact. Since the contacting surfaces, that is the lip corner 40 and the inclined surfaces 38, are annular in shape, any deformation in these surfaces would produce a deformation in the area of contact. With a smaller line of contact, the chances of deformation in the contacting surfaces is lessened because the area of contact is less. In this way a more effective sealing contact is formed between the rotating member and the stationary member throughout the rotation of the shaft.

In the radially inward surface 44 of the rotatable member 36 is an annular groove or channel 46 similar in size and shape to the previously described groove 16 in the stationary member 10. The groove 46 contains an annular sealing ring 48 of such size and shape that it will make a sealing contact with the adjacent shaft surface and with the bottom of said groove. The contact made between the sealing ring 48 and the shaft 50 and the bottom of the groove produces a union between the rotatable member 36 and the shaft 50 so that the rotatable member rotates along with the shaft as the external torque is applied to the shaft.

The radially inward surfaces 44 do not come into contact with the surface of the adjacent shaft 50. Since the sealing contact with the shaft is made by the ring seal 48, this surface is not utilized as a moving or sliding seal. Therefore, to reduce the required tolerances and finishes on the shaft and the rotatable member, it has been found desirable not to have said surfaces 44 contact the shaft. Further by not having surfaces 44 contact the shaft, member 36 is free to pivot slightly about the ring seal 48. This provides a means of correcting any misalignments or malformations in the flexible lips 26, 30 as they bear against the inclined surfaces 38 of said member during rotation.

In the presently preferred embodiment of the invention it has been found desirable to construct the stationary member 10 of a strong, resilient material, preferably material of the nature of nylon or Teflon. While Teflon has a lower coefficient of friction, it has been found less desirable than nylon because Teflon has less tendency to return to its previous shape after deformation under load. Therefore, to be sure that the flexible lips 26, 30 will not be deformed by the rotation of the shaft and rotatable member, nylon has been found most desirable for the construction of the stationary member 10.

While nylon may also be used for the material of the rotatable member 36, it has been found more desirable to use a material such as stainless steel. Stainless steel has a greater degree of dimensional stability than nylon and therefore does not substantially change its shape with age. To reduce the friction force developed at line of contact of the preferred embodiment, a narrow annular strip 96 of Teflon is embedded into the rotatable member along the line of contact or a thin annular layer of Teflon can be placed on the surface of the rotatable member along the line of contact. By doing this, the force due to friction developed at the line of contact is reduced because of the above mentioned property of Teflon.

To provide the necessary force of contact between said lip corners 40 and the inclined surfaces 38 of the rotatable member, the width of said channel formed by the lips 26, 30 is controlled by mating of the two annular rings 12, 14. To prevent corner 52 of the ring 14 from coming into contact with the corner radius of the larger ring 12, before the mating surfaces are in contact, said corner has been chamfered. The chamfered corner 52 assures a proper width of said channel and a complete joint and seal between the said rings after they have been properly mated together.

As shown in FIG. 1, an annular spacer ring 56 can be provided between the larger annular ring 12 and the narrow surface of the smaller annular ring 14. Through the use of spacer 56, the force of contact of the corner of said lips 40 against said rotatable 36 member can be controlled through the variation of the width of the channel formed by the lips 26, 30. However, through proper formation of the annular rings, a channel of desired width can be formed to provide the desired force of contact between the said members, thus eliminating the need for said spacer.

As described above, the annular grooves 16, 46 in the larger annular ring 12 and the rotatable member 36 respectively contain sealing rings 18, 48 respectively. In the preferred embodiment of the invention said sealing rings have been shown as a conventional O-ring. While it has been found desirable to use an O-ring for said sealing rings, it is to be understood that the invention should not be specifically limited thereto, as any type of seal of like properties and utility will function as well. The sealing rings 18, 48 make contact with the surfaces adjacent to them and in doing this are distorted slightly by the force of the surface against the ring. This distortion is sufficient to provide a positive seal between the sealing unit and the adjacent surfaces against all eccentricities, diametrical tolerances, and shaft and housing surfaces roughnesses, but not to impart detrimental distortion to the sealing unit.

The seal of this invention contemplates a shaft and housing counterbore surfaces which are sufficiently smooth to seal statically against the sealing rings. In the preferred embodiment, the sealing rings are described as conventional O-rings. Therefore, since an O-ring will make a positive seal with a relatively rough surface, this greatly reduces the tolerances and surface finishes that are necessary for the shaft 50 and counterbore 20.

The preferred embodiment of the unitary shaft seal of this invention has been described as having a stationary member composed of a flexible material such as nylon and a rotatable member composed of a material with a low coefficient of friction such as stainless steel with a Teflon bearing strip embedded in the stainless at the point of contact of the two members. While the above description has been limited generally to the operation of the shaft at relatively low speeds, it should be understood that this invention should not be specifically limited to such operations. With the lower coefficient of friction of the Teflon-nylon combination and the mass of material of the rotatable member serving as a heat sink considerable high speeds of rotation can be borne by this seal.

FIG. 2 shows a modification of the preferred embodiment of the invention wherein the pair of annular rings are basically L-shaped in transverse cross section instead of as described for the preferred embodiment. The leg portion 64 of the first ring 60 has a greater length than the leg portion 66 of the second ring 62.

Extending radially inward from one surface 68 of the leg portion 64 of the first ring 60 at a point opposite the terminus of the inside surface 72 of the flange 74 of said ring is a flexible lip 76. Also extending radially inward from the inside surface 80 of the flange 82 of the smaller ring 62 is a second flexible lip 84.

With the first ring 60 arranged with the flange 74 extending radially outwardly with respect to the leg 64, the second ring 62 is brought into contact with the leg 64 of said first ring so that the flange 82 of the second ring extends radially inwardly, and the extreme edge of the leg 64 of the first ring is in contact with the inside surface 80 of the flange of the second ring. A recess 88 in the outer surface of the stationary member of the assembly is defined by the inside surface 72 of the flange 74 of the first ring and extreme edge 86 of the leg 66 of the second ring. By assembling the rings in this fashion a channel 90 is defined by the pair of flexible lips 76, 84.

The rotatable member 36 of the above described modification of the preferred embodiment of the invention is the same as that described previously and will not be repeated here.

To assemble the presently preferred embodiment of the shaft seal before insertion in the shaft housing, the first step before mating the two annular rings 12, 14 is to bring the rotatable member 36 into contact with the corner on the lip of the first ring 60. Then the lip on the second annular ring is brought into contact with the other inclined sides 38 of the rotatable member 36 as the second ring is mated to the first one.

To mate the two rings of the first embodiment, they are arranged into mounting position by placing the smaller ring 14 within the notch 28 in the larger ring with the flexible lip 30 extending parallel to the flexible lip 26, and are formed into the stationary member by use of a conventional bonding agent of the type used on nylon or Teflon or by an interaction of the two rings where they have been provided with notches and grooves (not shown) for a mechanical means of securing. To complete the mating, the two rings are placed in a clamping device to insure a proper bonding of the two rings when a bonding agent is used to secure them together. After removal from the clamp, the sealing rings 18, 48 are snapped into their respective grooves 16, 46. A similar procedure is used for the embodiment of FIG. 2.

After the seal has been made into a single unit it is ready for installation. Unlike most rotating shaft seals, this seal can be installed either by inserting the shaft 50 into the seal, after the seal has been mounted in the center bore 20 in the shaft housing 21, or by inserting the seal over the shaft 50 and then inserting the shaft into the housing 21. This provides a substantial advantage over prior art rotating shaft seals because a workman need not worry as to the procedure and direction of insertion of the seal.

As shown by FIG. 1, the seal can be held in place in the counterbore 20 in the shaft housing by a retaining ring 94. This ring snaps into an annular groove in the counterbore adjacent to the exposed surface of the sealing unit, and will prevent the unit from axial motion along the shaft. However, it has been shown this way only to depict a typical mounting of the ring within the housing. This seal has been designed particularly for use between pressured and non-pressured chambers. Therefore, if the seal is inserted into the housing 21 so that the pressure will force the seal against the edge 98 of the counterbore 20, the retaining rings 94 as shown in FIG. 1 are not necessary.

Although the now preferred embodiment and methods of the present invention have been illustrated and discussed it is to be understood that the invention need not be limited thereto for it is susceptible to change in form, detail and application within the scope of the appended claims.

In the above description, the unitary seal of this invention has been described as having a stationary member statically sealed to the counterbore of a shaft housing and a rotatable member statically sealed to and rotating with a rotating shaft. While in conventional shaft sealing this would be a typical utilization of this seal, it should be understood that this seal will function equally as well when the housing and member sealed thereto rotate and the shaft and member sealed thereto are stationary.

I claim:
1. A seal for a rotating shaft within a housing comprising: a first annular member having a base portion and a pair of flexible lips extending inwardly therefrom and defining a channel; a second annular member nested within the channel and including sloping sides converging toward the base portion of the first member, said sloping sides respectively making sliding line contact with the flexible lips, the portions of the sloping sides which contact the flexible lips being formed of material having a low coefficient of friction, said second member being movable radially within the channel of the first member to compensate for any eccentricity of the shaft with respect to the housing.

2. A unitary rotating shaft seal mountable within a shaft housing and circumscribed about a shaft, comprising: a first annular member having an annular groove in the radially outward surface of said member and a plurality of substantially parallel flexible lips extending radially inward from the inner surface of said member, thereby defining a channel, said lips having a sharp inner corner; a second annular member extending into said channel, including a pair of inclined sides each adapted to make a thin line of contact with one of said sharp corners thereby maintaining a rotating seal between said first and second members; said second member also having an annular groove in its radially inward surface; a flexible sealing ring recessed into said groove in said first member providing a static seal between said member and said housing; and a flexible sealing ring recessed into said groove in said second member providing a static seal between said shaft and said member.

3. A unitary rotating shaft seal mountable within a shaft housing to carry a rotatable shaft, comprising: an annular stationary member having an annular peripheral groove in its outer surface and a plurality of flexible lips extending inwardly from its inner surface, thereby defining a channel, said lips having a sharp inner corner; an annular rotatable member extending into said channel including a pair of inclined sides each adapted to make a thin line of contact with a portion of said flexible lips, thereby maintaining a seal between said stationary and rotatable members, said rotatable member having an annular peripheral groove in said stationary member to provide a static seal between said member and said shaft housing; and sealing means in the groove in said rotatable member making a sealing contact with said shaft and said member, thereby causing said member to rotate with said shaft.

4. A unitary rotating shaft seal mountable within a shaft housing to carry a rotatable shaft, comprising: a stationary member having an annular groove in the radially outward surface of said member and a plurality of parallel flexible lips extending radially inward from the inner surface of said member, thereby defining a channel, said lips having a sharp inner corner; a flexible sealing ring in said groove providing means for statically sealing said radially outward surface of said stationary member in said housing; an annular rotatable member extending into and in a contact overlapping relationship with said lips; said rotatable member having inclined sides thereby causing said lips to be deflected into a non-parallel relationship, said lips and inclined sides providing a tight, low friction thin line of contact seal between said stationary member and said rotatable member; and a flexible sealing ring recessed into the radially inward surface of said rotatable member making a sealing contact with the shaft and rotatable member thereby causing said rotatable member to rotate with said shaft.

5. A unitary rotating shaft seal mountable within a shaft housing to carry a rotatable shaft, comprising: a stationary member having an annular groove in the radially outward surface of said member and a plurality of substantially parallel flexible lips extending radially inward from the inner surface of said member, thereby defining a channel, said lips having a sharp inner corner; an annular rotatable member extending into and in a contact overlapping relationship with said lips and having inclined sides, and an annular groove in its radially inward surface, said sharp corners and said inclined sides defining a thin line of contact between said stationary and rotatable members; a flexible sealing ring recessed into said groove in the radially outward surface of said stationary member; and a flexible sealing ring recessed into said groove in said rotatable member providing a sealing contact between the shaft and rotatable member, and thereby causing said rotatable member to rotate with said shaft.

6. A unitary rotating shaft seal mountable within a shaft housing to carry a rotatable shaft, comprising: a stationary member consisting of a first matable annular ring and a second matable annular ring formed with a peripheral flange, said rings defining a sealing ring recess between said flange and said first matable annular ring; a ring seal interposed in said recess to mate with said shaft housing and hold said first and second annular rings in a non-rotatable position, said first and second annular rings each having an inwardly extending flexible lip, said lips being spaced apart to define a channel therebetween, said lips having a sharp inner corner; an annular shaped rotatable member having a peripheral groove in its inner wall including a pair of inclined sides, said member being interposed into the channel defined by said flexible lips to form a thin line of contact seal between the flexible lips and said rotatable member; a sealing ring in said groove in said rotatable member and making a sealing contact with the shaft and rotatable member to cause said rotatable member and sealing ring to rotate with the shaft.

7. A unitary rotating shaft seal mountable within a shaft housing to carry a rotatable shaft, comprising: a stationary member consisting of a first matable annular ring having an annular axially extending portion, an annular peripheral groove in the outer face of said ring and a flexible lip extending radially inward from its opposite face, said lip having a sharp inner corner, a second matable annular ring having a flange portion extending radially inward, said flange including a flexible lip having a sharp inner corner, said second ring mating with the axially extending portion of said first ring to define a channel between the flexible lips of said rings; a rotatable member extending into said channel, said member including a pair of inclined sides each adapted to make a thin line of contact with one of said sharp corners, thereby maintaining a sliding thin line of contact seal between said stationary and rotatable members; sealing means in said peripheral groove in said stationary member to provide a static seal between said member and said shaft housing; means in the groove in said rotatable member making a static sealing contact with said shaft and said rotatable member and thereby causing said member to rotate with said shaft; and an annular spacer ring disposed between the said second annular ring and said first annular ring and extending normal to the axis of rotation of said shaft to adjust the force of contact between said lips and said rotatable member.

8. A unitary rotating shaft seal, comprising: a stationary member consisting of a first matable annular ring having a recess on its radially outward surface and a notch in its radially inward surface, said ring also having a first flexible lip extending inwardly from said radially inward surface; a second annular ring matably interposed within said notch and having a second flexible lip extending inwardly parallel to said first lip and thereby defining a channel, said lips each having a sharp inward corner; an annular rotatable member extending into and in a contact overlapping relationship with said lips including a pair of inclined sides and a recess in its radially inward surface, said sharp lip corners and said inclined sides defining a thin line contact thereby providing a relatively distortion free, low coefficient of friction sliding seal between said stationary member and said rotatable member, a shaft housing having an internal counterbore and, carried within said counterbore, a longitudinal shaft; a first annular flexible sealing ring carried by the recess in said first annular ring for statically sealing said stationary member to said counterbore and a second annular flexible sealing ring carried by the recess in said rotatable member to make a static sealing contact with said shaft and rotatable member, thereby causing said rotatable member to rotate with said shaft.

References Cited in the file of this patent

UNITED STATES PATENTS

| 2,445,018 | Brady | July 13, 1948 |
| 2,764,432 | Leister et al. | Sept. 25, 1956 |
| 2,917,329 | Laser | Dec. 15, 1959 |